United States Patent
Ha et al.

(10) Patent No.: US 10,873,075 B2
(45) Date of Patent: Dec. 22, 2020

(54) COMPOSITE ANODE MATERIAL INCLUDING PARTICLES HAVING BUFFERED SILICON-CONTAINING CORE AND GRAPHENE-CONTAINING SHELL

(71) Applicant: SINODE SYSTEMS, INC., Chicago, IL (US)

(72) Inventors: Seonbaek Ha, Chicago, IL (US); Cary M. Hayner, Chicago, IL (US); Joshua J. Lau, Chicago, IL (US); James McKinney, Chicago, IL (US); Francis Wang, Chicago, IL (US); Woo Hyun Chae, Chicago, IL (US)

(73) Assignee: NANOGRAF CORPORATION, Chicago, IL (US)

( * ) Notice: Subject to any disclaimer, the term of this patent is extended or adjusted under 35 U.S.C. 154(b) by 119 days.

(21) Appl. No.: 15/694,144

(22) Filed: Sep. 1, 2017

(65) Prior Publication Data
US 2019/0074508 A1    Mar. 7, 2019

(51) Int. Cl.
| | |
|---|---|
| *H01M 4/36* | (2006.01) |
| *H01M 4/134* | (2010.01) |
| *H01M 10/0525* | (2010.01) |
| *H01M 4/133* | (2010.01) |
| *H01M 4/48* | (2010.01) |
| *H01M 4/62* | (2006.01) |
| *H01M 4/139* | (2010.01) |
| *H01M 4/1395* | (2010.01) |

(Continued)

(52) U.S. Cl.
CPC ......... *H01M 4/366* (2013.01); *H01M 4/0471* (2013.01); *H01M 4/13* (2013.01); *H01M 4/133* (2013.01); *H01M 4/134* (2013.01); *H01M 4/139* (2013.01); *H01M 4/1395* (2013.01); *H01M 4/386* (2013.01); *H01M 4/483* (2013.01); *H01M 4/62* (2013.01); *H01M 4/621* (2013.01); *H01M 4/625* (2013.01); *H01M 10/0525* (2013.01); *H01M 2220/20* (2013.01)

(58) Field of Classification Search
CPC ...... H01M 4/366; H01M 4/133; H01M 4/134; H01M 4/483; H01M 4/621
USPC ....................................................... 429/218.1
See application file for complete search history.

(56) References Cited

U.S. PATENT DOCUMENTS

| | | | |
|---|---|---|---|
| 8,551,650 B2 | 10/2013 | Kung et al. | |
| 2006/0234127 A1* | 10/2006 | Kim ................... | H01M 4/0402 429/232 |

(Continued)

FOREIGN PATENT DOCUMENTS

CN        106058167 A   * 10/2016

OTHER PUBLICATIONS

Wikipedia contributors. "Graphene." Wikipedia, The Free Encyclopedia. Wikipedia, The Free Encyclopedia, Aug. 27, 2019. Web. Aug. 27, 2019. (Year: 2019).*

(Continued)

*Primary Examiner* — Sean P Cullen
(74) *Attorney, Agent, or Firm* — The Marbury Law Group, PLLC

(57) ABSTRACT

A composite anode material including an active material including a core of silicon, silicon oxide, or combination thereof encased within a buffer layer including a polymeric material, and a shell encapsulating the active material. The shell may include graphene, graphene oxide, partially reduced graphene oxide, or combinations thereof.

20 Claims, 8 Drawing Sheets

(51) Int. Cl.
*H01M 4/04* (2006.01)
*H01M 4/38* (2006.01)
*H01M 4/13* (2010.01)

(56) References Cited

U.S. PATENT DOCUMENTS

| | | | |
|---|---|---|---|
| 2007/0122707 A1* | 5/2007 | Kwon | H01M 4/133 |
| | | | 429/231.95 |
| 2012/0202112 A1* | 8/2012 | Yushin | H01M 4/38 |
| | | | 429/200 |
| 2013/0004846 A1* | 1/2013 | Kim | B82Y 30/00 |
| | | | 429/213 |
| 2013/0052536 A1* | 2/2013 | Belharouak | H01M 4/366 |
| | | | 429/231.8 |
| 2013/0199605 A1 | 8/2013 | Huang et al. | |
| 2013/0344392 A1* | 12/2013 | Huang | H01M 4/366 |
| | | | 429/231.8 |
| 2014/0022700 A1* | 1/2014 | Zhao | H01M 4/0428 |
| | | | 361/502 |
| 2014/0127576 A1* | 5/2014 | Kato | H01M 4/131 |
| | | | 429/213 |
| 2014/0255777 A1* | 9/2014 | Jeong | H01M 4/134 |
| | | | 429/211 |
| 2015/0270534 A1* | 9/2015 | Nozato | H01M 4/133 |
| | | | 429/217 |
| 2015/0280219 A1* | 10/2015 | Xiao | H01M 4/366 |
| | | | 429/231.8 |
| 2016/0172665 A1* | 6/2016 | Zhou | H01M 4/366 |
| | | | 429/338 |
| 2016/0365573 A1* | 12/2016 | Li | H01M 4/366 |
| 2016/0372784 A1 | 12/2016 | Hayner et al. | |
| 2017/0141387 A1* | 5/2017 | Hayner | H01M 4/134 |
| 2017/0170521 A1* | 6/2017 | Narita | G04G 19/00 |
| 2017/0263922 A1* | 9/2017 | Fujiwara | H01M 4/364 |
| 2017/0368535 A1* | 12/2017 | Chopra | B01J 21/18 |
| 2018/0062179 A1* | 3/2018 | Wada | H01M 4/131 |
| 2018/0248181 A1* | 8/2018 | Kang | H01G 11/86 |

OTHER PUBLICATIONS

Wikipedia contributors. "Graphite." Wikipedia, The Free Encyclopedia. Wikipedia, The Free Encyclopedia, Aug. 23, 2019. Web. Aug. 27, 2019. (Year: 2019).*

Wikipedia contributors. "Pitch (resin)." Wikipedia, The Free Encyclopedia. Wikipedia, The Free Encyclopedia, Aug. 20, 2019. Web. Aug. 27, 2019. (Year: 2019).*

Paireau, et al., "Si/C composites prepared by spray drying from cross-linked polyvinyl alcohol as Li-ion batteries anodes," ElectroChimica Acta, vol. 174, pp. 361-368, (2015).

* cited by examiner

COMPOSITE ANODE MATERIAL INCLUDING PARTICLES HAVING BUFFERED SILICON-CONTAINING CORE AND GRAPHENE-CONTAINING SHELL

TECHNICAL FIELD

This invention relates to the art of electrochemical cells, and more particularly, to a composite anode material including encapsulated buffered active material particles, and methods of making the same.

BACKGROUND

Lithium (Li) ion electrochemical cells typically have a relatively high energy density and are commonly used in a variety of applications which include consumer electronics, wearable computing devices, military mobile equipment, satellite communication, spacecraft devices and electric vehicles. Lithium ion cells are particularly popular for use in large-scale energy applications such as low-emission electric vehicles, renewable power plants and stationary electric grids.

Additionally, lithium ion cells are at the forefront of new generation wireless and portable communication applications. One or more lithium ion cells may be used to configure a battery that serves as the power source for these applications. The explosion in the number of higher energy demanding applications and the limitations of existing lithium ion technology are accelerating research for higher energy density, higher power density, higher-rate charge-discharge capability, and longer cycle life lithium ion cells.

Lithium ion cells are mainly composed of an anode, for example, graphite, a carbonate-based organic electrolyte, and a cathode comprising a cathode active material, for example, lithium cobalt oxide ($LiCoO_2$). Lithium ions are intercalated and deintercalated between the anode and the cathode through the electrolyte during discharge and charge. When electrical energy is removed from the cell to supply power, or is discharging, lithium ions move from the negative electrode (anode) to the positive electrode (cathode). When the cell is supplied electrical energy for conversion to stored chemical energy, or is charging, the opposite occurs. Lithium ions generally move from the positive electrode (the cathode) to the negative electrode (the anode) during charging. For the example, the theoretical capacities of a graphite anode and a $LiCoO_2$ cathode are 372 mAh/g and less than 160 mAh/g, respectively. These theoretical charge capacities, however, are often too low for the recent surge in higher energy demanding applications.

Incorporating silicon within a carbon based anode significantly increases the capacity of the anode material. Silicon has a theoretical capacity of about 4,200 mAh/g which significantly increases cell capacity when incorporated within an electrode comprising graphite, graphene, or other carbon based active material. Examples of electrodes comprising graphene and silicon are provided in U.S. Pat. No. 8,551,650 to Kung et al. and U.S. patent application publication number 2013/0344392 to Huang et al., both of which are incorporated fully herein by reference.

Furthermore, it is generally understood that silicon that is incorporated within these electrodes typically undergoes a significant volume expansion of up to 400 percent upon the insertion and extraction of lithium during the cycling process. As a result of this significant volume increase, the silicon within the electrode structure experiences a significant mechanical stress which typically causes the material to fracture and impart defects within its structure. Such structural degradation of the silicon within the active electrode material leads to a reduction in intercalation and deintercalation of the lithium ions within the active electrode material which causes a reduction in capacity and cycle life. In addition, the mechanical degradation of the silicon typically results in electrical disconnection of the silicon within the active electrode material which generally leads to a further reduction of coulombic efficiency and capacity retention.

Accordingly, there is a need for an electrochemical cell with increased capacity and cycle life.

SUMMARY

Various embodiments provide a composite anode material comprising a plurality of capsules, each capsule comprising graphene, reduced graphene oxide, graphene oxide, or a combination thereof, and at least one active material particle disposed inside each of the plurality of capsules. Each active material particle may include a core comprising silicon, silicon oxide or combinations thereof and a buffer layer surrounding the core, with the buffer layer comprising a polymeric material.

Various embodiments provide an electrode comprising: a plurality of capsules, each capsule comprising graphene, reduced graphene oxide, graphene oxide, or a combination thereof; at least one active material particle disposed inside each of the plurality of capsules; and a binder. Each active material particle may include a core comprising silicon, silicon oxide or combinations thereof and a buffer layer surrounding the core, with the buffer layer comprising a polymeric material.

Various embodiments provide a method of forming an electrode, the method comprising: mixing a composite anode material with a solvent and a binder to form a slurry. Coating a substrate with the slurry and drying the coated substrate to form the anode electrode. The at least one active material particle may include a core comprising silicon, silicon oxide, or combinations thereof and a buffer layer surrounding the core, with the buffer comprising a polymeric material.

Various embodiments provide a method of forming composite anode material particles, the method comprising: combining core particles comprising silicon, silicon oxide, or a combination thereof, with a first liquid and a polymeric material, to form a first mixture; heating the first mixture at a first temperature to form active material particles comprising the core particles coated with the polymeric material; combining the active material particles with graphene, graphene oxide, partially reduced graphene oxide or a combination thereof and a second liquid, to form a second mixture; and heating the second mixture at a second temperature greater than the first temperature, to form composite anode material particles.

DETAILED DESCRIPTION

Figure 1:
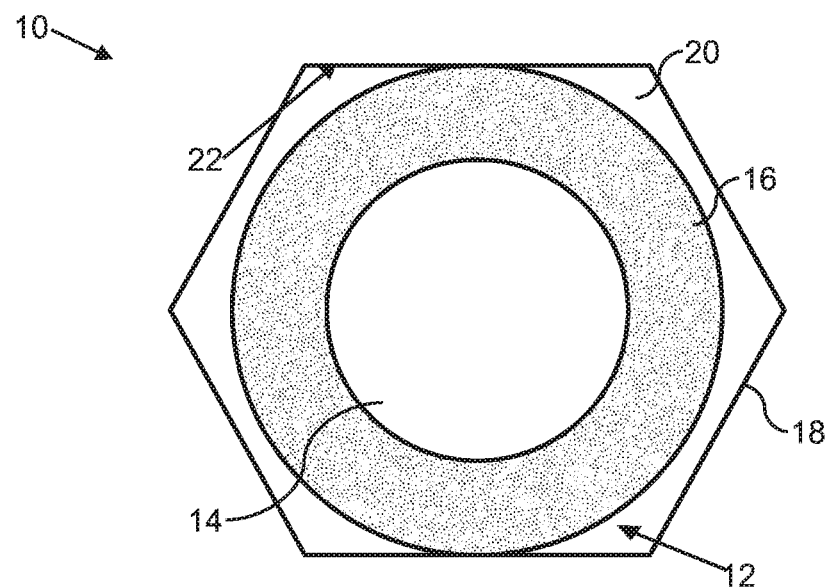
FIG. 1 illustrates a cross-sectional view of an embodiment of a particle of the composite anode material of the present application having a buffer matrix structure.

In general, the present invention relates to the structure and method of formation thereof of a composite anode material comprising silicon and graphene. The composite anode material may be formed into an electrode that is incorporatable within an electrochemical cell. More specifically, the present invention relates to the structure and method of formation thereof of a composite anode material comprising silicon and graphene that may be formed into an electrode for use within a lithium ion electrochemical cell that is designed to provide increased capacity and cycle life.

In various embodiments, the composite anode material comprises a plurality of particles, each of which comprises at least one core of a composite anode material, such as silicon or silicon oxide, which is encased within a buffer layer of a polymeric material, such as polyvinyl alcohol, thereby forming an active material particle. In various embodiments, the buffer layer that surrounds the core material mechanically supports the core and allows for mechanical expansion of the core material during lithiation and delithiation.

In various embodiments, at least one active material particle is encased or encapsulated within a capsule or shell composed of at least one of graphene, at least partially reduced graphene oxide or graphene oxide. The capsule or shell structure formed by the at least one of graphene, at least partially reduced graphene oxide or graphene oxide that encapsulates the at least one active material particle further provides an internal void space that allows for mechanical expansion of the core material. The void space within the capsule or shell accommodates for the volume expansion of the core particle therewithin. Thus, the particle structure of the composite anode material provides a buffer matrix in which the combination of the polymeric buffer layer and void space within the capsule structure minimizes mechanical degradation of the core material during lithiation and delithiation which results in increased cycle life and capacity retention.

In various embodiments, the polymeric buffer layer may be cross-linked. Cross-linking the polymer coating provides added rigidity to the buffer layer thereby further providing mechanical support of the core material. In various embodiments, cross-linking the polymeric coating, particularly with boron, creates a water insoluble coating which improves retention of the coating around the silicon. Furthermore, the polymeric coating may also be pyrolyzed thus converting the polymer coating to carbon. The pyrolysis process thus reduces the thickness of the coating thereby further increasing the void space between the core material and an interior surface of the capsule, thus allowing for further expansion of the core while still providing mechanical support. Furthermore, the capsule serves to capture fractured pieces of the core material, should the core material fracture or mechanically degrade. Thus, by capturing the broken pieces, the pieces are positioned in a congruent orientation that minimizes electrical disconnection. The buffer matrix that surrounds the core particles thus provides mechanical support and accommodates for expansion of the core that minimizes potential mechanical fracture and helps to ensure that capacity of the resulting lithium ion cell is maintained over multiple charge discharge cycles.

As defined herein a "secondary" electrochemical cell is an electrochemical cell or battery that is rechargeable. "Capacity" is defined herein as the maximum amount of energy, in ampere-hours (Ah), that can be extracted from a battery under certain specified conditions; the amount of electric charge that can be delivered at a rated voltage. Capacity may also be defined by the equation: capacity=energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of active electrode material. Specific capacity may be measured in gravimetric units, for example, (A·h)/g or volumetric units, for example, (A·h)/cc. Specific capacity is defined by the mathematical equation: specific capacity (Ah/Kg)=capacity (Ah)/mass (Kg). "Rate capability" is the ability of an electrochemical cell to receive or deliver an amount of capacity or energy within a specified time period. Alternately, "rate capability" is the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry. "C-rate" is defined herein as a measure of the rate at which a battery is discharged relative to its maximum capacity. For example, a 1 C rate means that the discharge current will discharge the entire battery in 1 hour. "Power" is defined as time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations: power (W)=energy (Wh)/time (h) or power (W)=current (A)×voltage (V). Coulombic efficiency is the efficiency at which charge is transferred within an electrochemical cell. Coulombic efficiency is the ratio of the output of charge by a battery to the input of charge.

A "composite anode material" may be defined as a material that may be configured for use as an anode within an electrochemical cell, such as a lithium ion rechargeable battery and that includes active material particles encapsulated in a capsule of graphene, reduced graphene oxide, or graphene oxide. The anode material may include anode material particles, a binder, and may optionally include a conductivity enhancing agent. An "electrochemically active material" or "active material" is defined herein as a material that inserts and releases ions, such as ions in an electrolyte, to store and release an electrical potential. A "capsule" or "shell" is defined herein as a structure that surrounds and encases one or more active material particle. An "active material particle" is defined herein as a particle of the active material that may be disposed within the capsule, and includes at least one core surrounded by one or more coating layers. In some embodiments, the core material may be an electrochemically active material. A "buffer layer" is a layer of material that surrounds and encases at least one core particle of an active material. The buffer layer may include more than one coating layer. "Void space" is defined herein a space between the active material particles and an interior surface of the capsule or shell structure.

FIG. 1 illustrates a cross-sectional view of an embodiment of a particle of the composite anode material 10 of the present application. As shown, the particle of the composite anode material 10 comprises an active material particle 12 comprising an electrochemically active core material 14 that is encased within a buffer layer 16. As illustrated, the at least one active material particle 12 is encapsulated within a capsule or shell 18 composed of at least one of graphene, at least partially reduced graphene oxide, or graphene oxide. In an embodiment, the core material 14 may comprise silicon, silicon oxide or combinations thereof. In an embodiment, the buffer layer 16 that encases particles of the core material 14 may comprise a carbon-containing material such as citric acid, D-glucose or a polymeric material. Non-limiting examples of polymeric materials include, but are not limited to, polyamide, polyvinyl alcohol (PVA), polyvinyl butyral (PVB), polyvinyl formal (PVF), polyacrylonitrile (PAN), and combinations thereof. In one embodiment, the buffer layer 16 that encases particles of the central part of the core material 14 may comprise one or more coating parts.

Encasing the active material particle 12 within the capsule 18 forms a void space 20 between the active material particle 12 and an interior surface 22 within the capsule 18 structure. This void space 20 between active material particle 12 and the interior surface 22 of the capsule structure 18 provides for volume expansion of the core material 14, i.e., silicon or silicon oxide particles, therewithin, thereby increasing capacity retention and coulombic efficiency. In addition, the buffer layer 16 that surrounds the at least one core particle 14 provides mechanical support that helps minimize mechanical deformation when the core material 14 expands during lithiation and delithiation.

Thus, the particle structure of the composite anode material 10 of the present invention comprises a buffer matrix which comprises the buffer layer 16 and the void space 20 provided within the capsule 18 between the particles of the active material particle 12 and the interior surface 22 of the graphene capsule 18. The void space 20 within the graphene capsule 18 provides room within which the core material 14, i.e., silicon can expand. In addition, the buffer layer 16 around the core 14 provides mechanical support designed to minimize mechanical degradation and spalling of the core material, i.e., silicon or silicon oxide, during lithiation and delithiation. In addition, the particle structure shown in FIG. 1, further minimizes solid-electrolyte interphase (SEI) loss as the capsule structure 18 compresses the core 14 and thus compresses the SEI against the core 14, thereby minimizing the possibility of mechanical degradation of the SEI from the silicon particle surface. Furthermore, should the core 14 fracture, the capsule structure 18 serves to hold the fractured pieces together in a congruent orientation such that at least some of the fractured pieces are in physical contact, thereby minimizing electrical disconnection and capacity loss.

Figure 2:
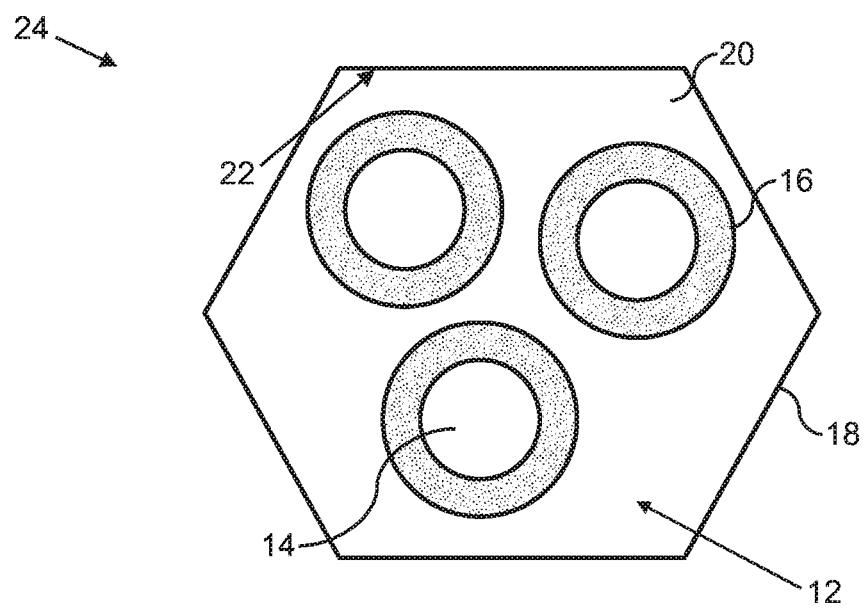
FIG. 2 shows a cross-sectional view of an alternate embodiment of a particle of the composite anode material of the present application having a buffer matrix structure.

FIG. 2 illustrates an alternative embodiment of a particle 24 of the composite anode material of the present application. As illustrated, the particle 24 comprises a plurality of active material particles 12 encapsulated within the capsule 18 formed by at least one sheet of graphene, graphene oxide, or at least partially reduced graphene oxide. Similar to the embodiment shown in FIG. 1, each active material particle 12 of the plurality of particles within the particle 24 comprises a core material 14 that is surrounded by a buffer layer 16. In an embodiment, each particle 24 may comprise a core material loading, i.e., silicon loading, in which 50 weight percent or more of the particle 24 comprises the core material 14. In an embodiment, the particle 24 may have a core material loading in which from about 60 weight percent to about 80 weight percent of the total weight of the electrochemically active particle 24 comprises the core material 14.

Figure 3:
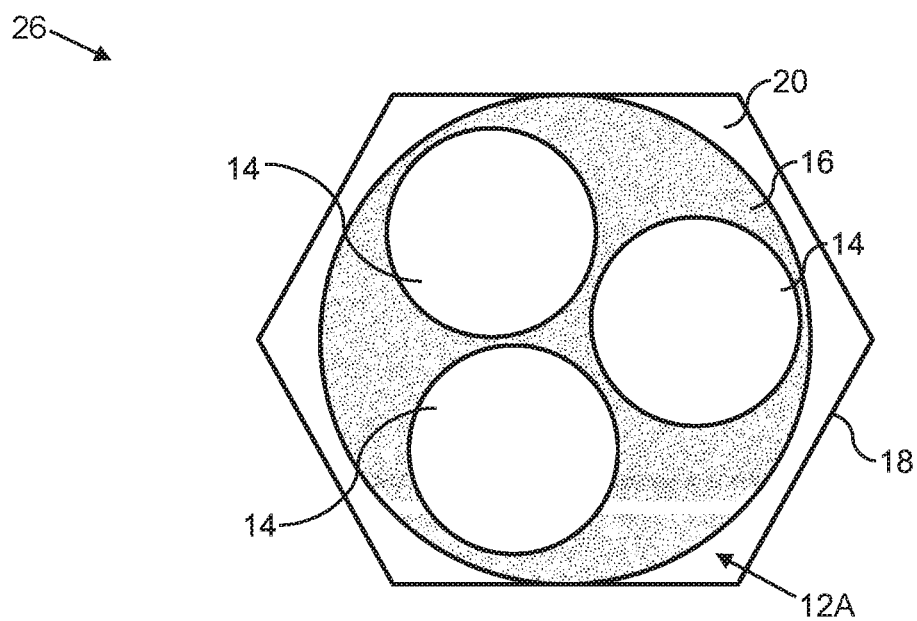
FIG. 3 shows a cross-sectional view of an alternate embodiment of a particle of the composite anode material of the present application having a buffer matrix structure.

FIG. 3 illustrates an alternative embodiment of a particle 26 of the composite anode material of the present application. As illustrated, the particle 26 comprises an active material particle 12A encapsulated within the capsule 18 comprising at least one sheet of graphene, graphene oxide, at least partially reduced graphene oxide or combinations thereof. The active material particle 12A comprises at least two cores 14 coated with the buffer layer 16. In an embodiment, the particle 26 may comprise a core material loading in which 50 weight percent or more of the particle 26 comprises the core material 14. In an embodiment, the particle 26 may have a core loading in which from about 60 weight percent to about 80 weight percent of the total weight of the electrochemically active particle 26 comprises the core material 14.

In an embodiment, particles of the core material 14, such as silicon or silicon oxide, within either of the embodiments of the particles 10, 24, or 26 shown in FIGS. 1, 2, and 3, respectively, may have an average particle size that is less than 500 nm. Alternatively, the particles of the core material 14, may have an average particle size that ranges from about 50 nm to about 400 nm. The buffer layer 16 may have an average thickness that ranges from about 1 nm to about 50 nm. Alternatively, the average thickness of the buffer layer 16 may range from about 1 nm to about 25 nm, or the average thickness of the buffer layer 16 may range from about 1 nm to about 10 nm.

In an embodiment, the buffer layer 16 comprising a polymeric material such as polyvinyl alcohol (PVA), may be chemically cross-linked. In an embodiment, the buffer layer 16 is chemically cross-linked with boric acid. Additional cross-linking agents may include but are not limited to, citric acid, glutaraldehyde (GA), and fumaric acid. Chemically cross-linking the polymeric material of the buffer layer 16 imparts rigidity to the layer thereby increasing mechanical support about the core 14. In addition, chemically cross-linking polyvinyl alcohol (PVA) with boric acid modifies the PVA so that it is insoluble in water. Water-insoluble PVA is beneficial in that it helps ensure that the buffer layer 16 stays intact around the core 14 and helps ensure the buffer matrix structure.

In an embodiment, particles of the active material particle 12, such as polymeric coated silicon particles, may be pyrolyzed. Pyrolysis is a process by which heat is applied to convert an organic material into carbon or a carbon containing residue. As applied to the present application, heat may be applied to the active material particle 12 that is encased within the capsule 18 to convert the polymeric buffer layer 16 into carbon. In addition, by converting the polymeric buffer layer into a carbon coating, the thickness of the buffer layer is reduced thereby providing increased void space 20 within the capsule structure 18. The increased void space 20 within the capsule 18 accommodates for additional volume expansion of particles of the core material 14, i.e., silicon particles that increase capacity retention and coulombic efficiency. Furthermore, the pyrolyzed buffer layer 16 provides for a buffer that mechanically supports the silicon particles. In an embodiment, the composite anode material 10 may be heated at a temperature ranging from about 650° C. to about 750° C. in an inert atmosphere such argon, nitrogen, or a combination thereof for about 30 minutes to about 2 hours.

Figure 4:
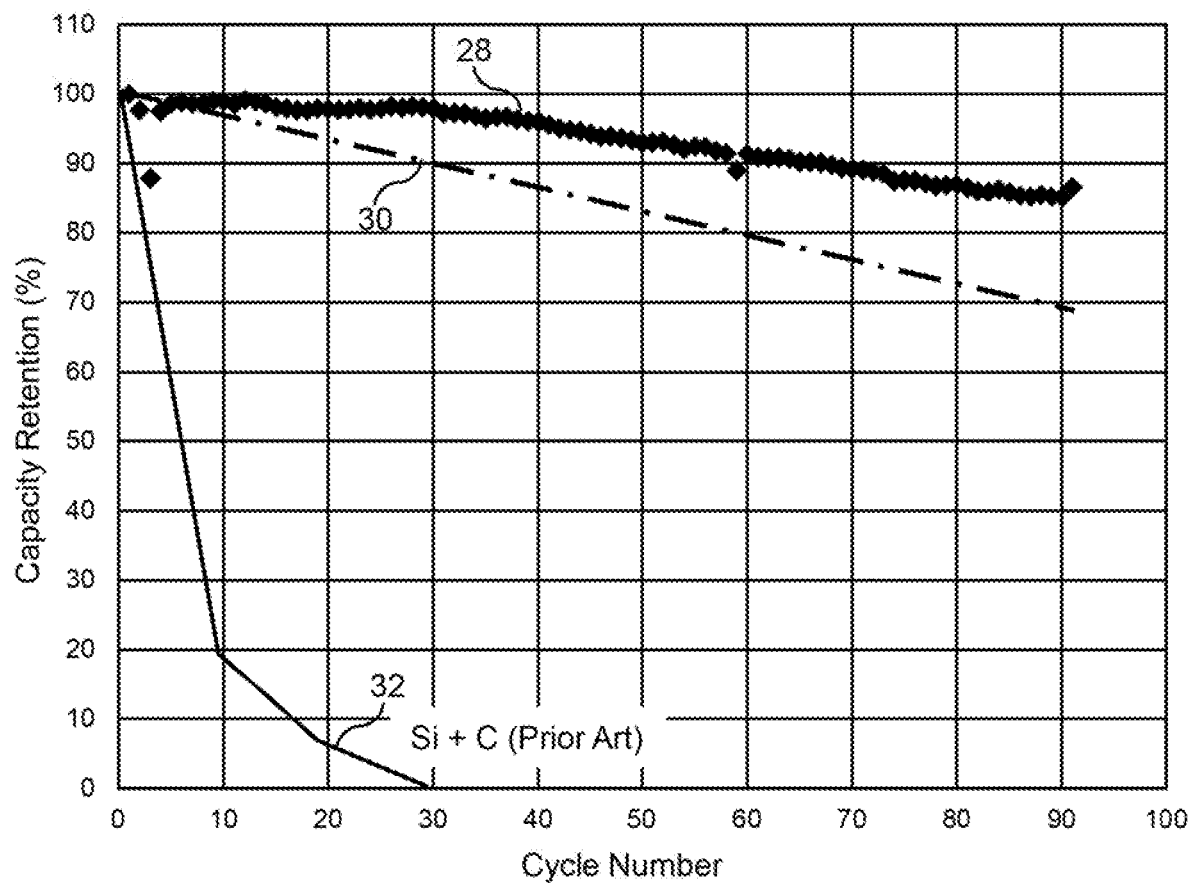
FIG. 4 illustrates an exemplary percent capacity retention lithium ion cell discharge testing results using a buffer matrix anode active material formulation of the present application compared to cells comprising prior art anode active materials.

FIG. 4 illustrates an embodiment of percent capacity retention as a function of discharge cycle for an exemplary lithium ion electrochemical cells constructed with anodes comprising composite anode materials having various material structures. Curve 28 illustrates an example percent capacity retention response for an anode active material comprising an embodiment of the composite anode material 24 of the present application. In the embodiment, the active material 24 comprises boric acid cross-linked PVA coated silicon in a graphene capsule 18. As shown the material of the present application exhibits a percent capacity retention (C/2 discharge testing) after 90 discharge cycles of about 85 percent. Curve 30 illustrates an exemplary percent capacity retention response for an anode active material comprising graphene wrapped silicon fabricated per U.S. Pat. App. Pub. No. 2013/0199605 to Huang et al. In this exemplar, the active material is comprised of silicon wrapped in crumpled graphene. As shown the material of the present application, in contrast to the exemplar of curve 30, exhibits a percent capacity retention (C/2 discharge testing) after 90 discharge cycles of about 70 percent. Curve 32 shows an exemplary percent capacity retention response (C/20 discharge testing) for an anode active material as disclosed in "Si/C composites prepared by spray drying from cross-linked polyvinyl alcohol as Li-ion batteries anodes" *Electrochimica Acta* 174 (2015) 361-368 to Paireau et al. In the example, an anode active material comprising silicon coated in thermally cross-linked PVA and further pyrolyzed at 1050° C. in nitrogen for 3 hours was tested at a discharge rate of C/20. As illustrated, the material exhibited a significant decrease in capacity retention as a function of discharge cycle. As shown in the exemplar, capacity retention decreased to about 20 percent after 10 cycles and 10 percent after about 20 cycles. The significant loss in capacity retention of the exemplar disclosed by Paireau et al., is believed to be attributed to the lack of a graphene capsule or shell which provides void space for the volume expansion of the silicon material. Thus, the lack of a graphene capsule or shell causes the material to break apart and diffuse within the electrode.

Table I further illustrates the reduced capacity retention exhibited by the anode active material comprising pyrolyzed silicon coated in thermally cross-linked PVA as disclosed by Paireau et al. As illustrated, lithium ion cells constructed with anode comprising the material exhibit significant capacity loss such that by the $30^{th}$ delithiation cycle, capacity has significantly decreased as shown by the calculated capacity retention percentages. It is believed that the loss in capacity with cycling is attributed to a lack of a graphene capsule and the fact that the polyvinyl alcohol coating was thermally cross-linked and not chemically cross-linked in boric acid as disclosed by the applicants. Furthermore, the prolonged pyrolysis process is also believed to degrade capacity retention.

TABLE I

| Si/C (wt %) | First Lithiation Capacity (mAh/g) | First Coulombic Efficiency (%) | $30^{th}$ Delithiation Capacity (mAh/g) | Capacity Retention (%) at Cycle 30 |
| --- | --- | --- | --- | --- |
| 85/15 | 2399 | 85 | <125 | 6.13 |
| 61/39 | 1592 | 85 | <50 | 9.24 |
| 44/56 | 834 | 78 | <500 | 76.9 |
| 40/60 | 539 | 62 | <250 | 77.8 |

Preparation of Si/PVA Powder

In an embodiment, the active material particle 12 is fabricated by making a first solution comprising powdered polyvinyl alcohol (PVA) mixed with deionized water. In an embodiment, the polyvinyl alcohol (PVA) has a molecular weight that ranges from 30,000 to about 200,000. In an embodiment, the PVA solution comprises from about 1 weight percent to about 4 weight percent PVA. A second solution comprising silicon or silicon oxide particles mixed in deionized water is prepared. In an embodiment, the second solution has a mass fraction of silicon particles, silicon oxide particles, or combination thereof that ranges from about 1 weight percent to about 5 weight percent. After the respective first and second solutions are prepared, the two solutions are combined to create a third solution of silicon or silicon oxide and PVA. In an embodiment, the mass fraction silicon or silicon oxide within the third solution may range from about 10 weight percent to about 80 weight percent. The third solution is heated at a temperature ranging from about 25° C. to about 70° C. to coat each of the silicon particles within the polyvinyl alcohol.

Preparation of Chemically Cross-Linked Particles

After preparation of the PVA coated silicon particles, the particles undergo a process in which the PVA surrounding the particles is chemically cross-linked. In an embodiment, the PVA coated silicon powder is mixed in a solvent of deionized water, isopropanol alcohol ($C_3H_8O$), isopropyl alcohol ($C_3H_8O$), ethanol ($C_2H_8O$), acetone ($C_3H_8O$) or combinations thereof to create a PVA/silicon solution having a solids content that ranges from about 1 to about 10 weight percent. In an embodiment the PVA coated silicon powder is mixed in a solution of deionized water and isopropanol to a solids weight percent of about 6.7. A solution of boric acid and deionized water having a boric acid concentration ranging from about 1 to about 5 weight percent is added to the PVA/silicon solution at a temperature ranging from about 50° C. to about 90° C. for about 3 to 5 hours to ensure cross-linking of the PVA. In an embodiment, a solution of about 3 weight percent boric acid in deionized water is added for about 3 hours at 60° C.

Preparation of Si/Graphene Composite

In an embodiment, a solution of PVA cross-linked coated Si particles is formed by adding deionized water to the PVA cross-linked coated Si particles. In an embodiment, the solution has a solids concentration of between about 1 weight percent to about 5 weight percent PVA cross-linked coated Si particles. A graphene solution comprising graphene and deionized water is prepared having a graphene solids concentration that ranges from about 1 weight percent to about 5 weight percent. The solution of cross-linked PVA coated silicon particles is mixed with the graphene solution. In an embodiment, the solids concentration of the cross-linked PVA coated silicon particles in the combined mixture solution ranges from about 1 weight percent to about 5 weight percent.

The combined solution is then heat treated at a temperature ranging from about 150° to about 220° in a spray drier or furnace in an inert atmosphere comprising compressed air, nitrogen, or combination thereof, to thermally reduce the solution to a dry powder composite comprising boron cross-linked PVA coated silicon particles that are encapsulated within graphene.

The resulting powder mixture may be further heat treated in an inert gas atmosphere, such as argon to pyrolyze the cross-linked polymer, such as polyvinyl alcohol, that surrounds each silicon particle. In an embodiment, the powder mixture is heated at a temperature that ranges from about 600° C. to about 800° C. for an hour. In an embodiment, the pyrolysis temperature is less than 900° C. It is noted that an appropriate heating profile is required so that the resulting particle structure is not damaged. For example, heating the PVA coating at a temperature that is too high or for too long a time may melt the cross-liked PVA coating which may cause the ideal buffer matrix particle structure to deform. In addition, the application of a temperature that is too high and/or for too long a time may cause a chemical reaction between the silicon and polymer material resulting in a material phase change.

Figure 5:
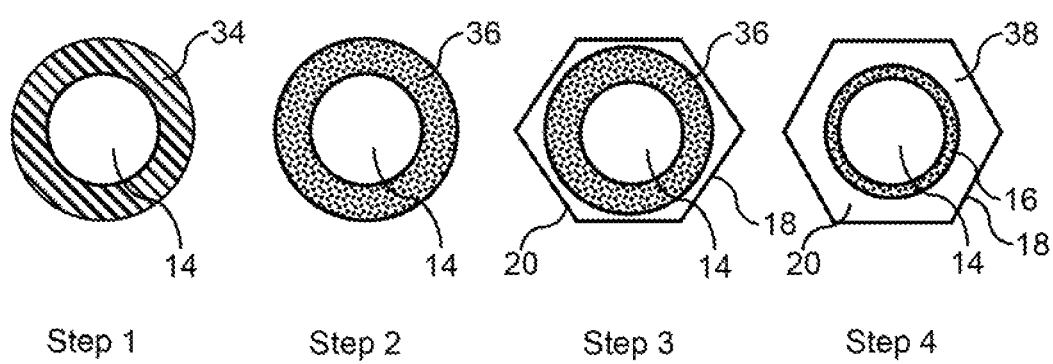
FIG. 5 is a schematic that illustrates the anode active material fabrication process of the present application.

FIG. 5 illustrates an overview of an embodiment of the material fabrication process of the present application. As shown, particles of the core material 14, i.e., silicon are first coated with a polymer 34 such as water soluble polyvinyl alcohol. In step 2, the polymer is at least partially chemically cross-linked, such as with boric acid, thereby forming a cross-linked polymer buffer layer 36. In step 3, at least one core material 14 coated with the chemically cross-linked buffer layer 36 is wrapped within at least one sheet of graphene, graphene oxide, at least partially reduced graphene oxide or combinations thereof thereby encasing the core 14 within the capsule structure 18 and lastly, in step 4, the wrapped core 14 is pyrolyzed to convert the crosslinked polymer buffer layer 36 to carbon. In addition, the pyrolysis process reduces the thickness of the buffer layer 16 which increases the void space 20 within the capsule 18 and creates a buffer matrix 38 that comprises the buffer layer 16 and void space 20.

Composite Anode Material

Example 1

Particles of a composite anode material comprising pyrolyzed boron-cross-linked PVA coated silicon encapsulated in graphene were synthesized. In an embodiment, a solution comprising polyvinyl alcohol (PVA) and silicon particles having a particle size of about 50 nm was mixed with deionized water. In an embodiment, the solution had a solids content of about 1 weight percent silicon. A second solution comprising 3 weight percent boric acid in deionized water was added to the PVA/silicon solution at a temperature of 60° C. to chemically cross-link the PVA with boron. The combined solution was then dried to remove the solvent, leaving the cross-linked PVA coated silicon. A solution comprising about 1 weight percent graphene in deionized water was created. The dried, cross-linked PVA coated silicon particles were then added to the graphene deionized water solution. About 7.2 g of the dried, cross-linked PVA coated silicon particles was added to 2.8 g of the graphene solution. The combined solution was then heat treated at a temperature of 190° C. in a spray drier or furnace having an inert atmosphere compressed air, nitrogen, argon, or a combination thereof to thermally reduce the solution to a dry powder composite comprising cross-linked PVA coated silicon particles wrapped in graphene.

Example 2

Particles of a composite anode material comprising pyrolyzed boron-cross-linked PVA coated silicon encapsulated in graphene were synthesized. In an embodiment, a solution comprising polyvinyl alcohol (PVA) and silicon particles having a particle size of about 100 nm was mixed with deionized water. In an embodiment, the solution had a solids content of about 1 weight percent silicon. A solution comprising 2 weight percent boric acid dissolved in deionized water was added to the PVA/silicon solution at a temperature of 60° C. to chemically cross-link the PVA with boron. The solution was then dried to remove the solvent, leaving particles of cross-linked PVA coated silicon. A solution comprising about 1 weight percent graphene in deionized water was created. The dried, cross-linked PVA coated silicon particles were then added to the graphene deionized water solution. About 7.2 g of the dried, cross-linked coated PVA silicon was added to 2.8 g of the graphene solution. The combined solution was then heat treated at 190° C. in a spay drier with an inert atmosphere comprising compressed air, nitrogen, argon, or a combination thereof to thermally reduce the solution to a dry powder composite comprising cross-linked PVA wrapped silicon particles wrapped in graphene.

The particles 10, 24, 26 of the composite anode material of the present invention may have a structure of a variety of shapes. Additionally, the particles 10, 24, 26 of the composite anode material of the present application may have a structure that is specifically engineered to be of a substantially crumpled, paper ball-like structure, or a substantially spherical-like shape in which graphene or graphene oxide forms the capsule 18 of the particle structure.

In an embodiment, particles 10, 24, 26 of the composite anode material, as described above, are fabricated into electrodes that are incorporated within a lithium electrochemical cell. In an embodiment, the composite anode material of the present invention is first formed into an electrode slurry that comprises the composite anode material, a binder, a conductive additive, and a solvent. Appropriate proportions of the composite anode material and the other constituents are mixed together to form the electrode slurry. Once fabricated, the electrode slurry is applied to a surface of an electrode current collector, composed of an electrically conductive material, such as, but not limited to copper, to create an electrode for use in an electrochemical cell. After the electrode slurry has been applied to the surface of a substrate, such as a current collector, the electrode slurry is dried and calendared to compress the electrode to a desired porosity.

A dispersant (including, but not limited to, surfactants, emulsifiers, and wetting aids), a thickening agent (including clays), defoamers and antifoamers, biocides, additional fillers, flow enhancers, stabilizers, cross-linking and curing agents may be added to the slurry mixture to ensure a homogenous mixture thereof. Examples of dispersants include, but are not limited to, glycol ethers (such as poly(ethylene oxide), block copolymers derived from ethylene oxide and propylene oxide (such as those sold under the trade name PLURONIC® by BASF), acetylenic dials (such as 2,5,8,11-tetramethyl-6-dodecyn-5,8-diol ethoxylate and others sold by Air Products under the trade names SURFYNOL® and DYNOL®), salts of carboxylic acids (including alkali metal and ammonium salts), and polysiloxanes. Additional examples of dispersants may include sodium dodecanoate, alkanolamide, lanolin, polyvinylpyrrolidone, sodium alkyl sulfate, sodium alkyl sulfonate, lecithin, polyacrylate, sodium silicate, and polyethoxy, nitrocellulose and TRITON® X-100 a dispersant having the chemical formula, $(C_2H_4O)_nC_{14}H_{22}O$ produced by DOW Chemical company of Midland Mich. Examples of thickening agents include longchain carboxylate salts (such aluminum, calcium, zinc, salts of stearates, oleats, palmitates), aluminosilicates (such as those sold under the MINEX® name by Unimin Specialty Minerals and AEROSIL® 9200 by Evonik Degussa), fumed silica, natural and synthetic zeolites. In an embodiment, the slurry mixture may comprise from about 0.01 to about 1.0 weight percent dispersant and/or thickening agent.

Binders may include, but are not limited to, a fluoro-resin powder such as polytetrafluoroethylene (PTFE), polyvinylidene fluoride (PVDF), poly(acrylic) acid, polyethylenetetrafluoroethylene (ETFE), polyamides, and polyimides, and mixtures thereof. Additional binders may include, but are not limited to, polyethylene (UHMW), styrene-butadiene rubber, cellulose, polyacrylate rubber, and copolymers of acrylic acid or acrylate esters with polyhydrocarbons such as polyethylene or polypropylene, and mixtures thereof. Solvents may include, but are not limited to, deionized water, ethanol, isopropyl alcohol, ethylene glycol, ethyl acetate, polar protiac solvents, polar aprotic solvents, N-methyl-2-pyrrolidone, and combinations thereof. Conductive additives may include but are not limited to, carbon black, an electrically conductive polymer, graphite, or a metallic powder such as powdered nickel, aluminum, titanium and stainless steel.

In an embodiment, the electrode active slurry of the present invention may comprise from about 50 to about 85 weight percent of the active electrode material, from about 10 to about 25 weight percent binder, from about 2 to about 7 weight percent the conductive additive and the remainder comprising the solvent or solvent solution. In an embodiment, the electrode active slurry has a solids content that ranges from about 15 to about 35 weight percent. In another embodiment, the slurry has a solids content that ranges from about 20 weight percent to about 30 weight percent. The solids content of the slurry allows for an ideal slurry viscosity that enhances a uniform coating on a substrate or current collector.

Each of the electrode active constituents may be added separately, or alternatively, as separate electrode suspensions comprising at least portions of the active electrode slurry component materials that are combined to create the electrode slurry of the present invention. In an embodiment, the components of the active electrode slurry are mixed to a uniform consistency. The slurry components may be mixed together using a variety of unlimited techniques such as ball milling or planetary mixing. Mixing times may range from about 30 minutes to 2 hours depending on batch size to achieve a uniform, homogenous slurry mixture. Milling media may also be added to the slurry to aid in creating a homogenous mixture. The electrode slurry may be further dispersed through manual or automated agitation. Such agitation may include physical shaking or rocking of the suspension. In addition, the electrode slurry may be subjected to ultrasonication for about 30 seconds to about 30 minutes to further disperse the silicon and carbon particles and help to create a homogeneous electrode suspension mixture. The electrode slurry should be prepared such that it is able to adequately flow and adhere onto the surface of the substrate. In an embodiment, the electrode slurry may have a viscosity ranging from about 0.1 Pa·S to about 1,000 Pa·S at a shear rate of between about 0.1 to 1,000 $s^{-1}$. After the electrode slurry has been formulated, the slurry is applied to the surface of a substrate. In an embodiment, the electrode slurry may be applied to the surface of a substrate comprising a metal, a polymer, a ceramic, and combinations thereof. Non-limiting examples of substrate materials may include, but are not limited to, metals such as copper, aluminum, nickel, and their alloys, polymers such as polyethylene, polyimide, and polyether ether ketone (PEEK), as well as alumina and various glasses. In an embodiment, the electrode slurry is applied to the surface of a current collector such as those composed of copper, nickel, aluminum, and combinations thereof.

In an embodiment, the electrode slurry may be applied to a desired thickness ranging from a few nanometers to a few micrometers using a variety of non-limiting application techniques. In an embodiment, the thickness of the applied electrode slurry may range from about 5 μm to about 50 μm. These application techniques may include, but are not limited to, the use of Meyer rod coating, the use of a doctor blade or knife, spray coating, dip coating, spin coating or brush application. In addition, the electrode slurry layer may be applied to a substrate surface through the use of thick-film or thin-film processing techniques.

Furthermore, in an embodiment, the surface of the substrate may be modified prior to the application of the electrode slurry to improve adhesion to the substrate surface. Examples of such substrate surface modifications include, but are not limited to, surface etching or surface roughening through the use corona treatment, acid etching, sand blasting or bead blasting.

After the electrode slurry has been applied to the surface of the substrate, it is then dried to remove at least a majority of the solvent. In an embodiment, the electrode slurry layer may be dried using convection air drying, a UV light source and/or an infrared light source. Additionally, the electrode slurry may be dried through the use of freeze drying, vacuum drying, or through osmosis. In addition, the slurry may be dried through application of a heat source that is applied directly to the exposed surface of the electrode slurry coating or alternatively, the electrode slurry may also be dried through application of a heat source to the underlying substrate, or both. Furthermore, the electrode slurry may be dried in a variety of non-limiting atmosphere conditions having a variety of atmospheric pressures. For example, a gas such as nitrogen may be used to control the drying process. In an embodiment, the applied electrode slurry is dried under a UV-light source for about 1 hour afterward it is then dried in an oven at about 80° C. for between about 2 to 24 hours, or until the solvent has been substantially removed from the resulting electrode structure.

In an embodiment, the electrode ink is dried to a thickness ranging from about 5 μm to about 50 μm. In another embodiment, the electrode ink is dried to a thickness ranging from about 8 μm to about 15 μm. The thickness of the dried electrode layer(s) may be targeted to achieve an increase in electrical power. The reduced electrode thickness minimizes the diffusion distance and which enables rapid lithium ion migration within the electrode structure.

The drying process of the present application allows for the active electrode material, particularly particles comprising a graphene encapsulated silicon or silicon oxide, to maintain the internal void space. Subjecting the dried electrode to further elevated heating conditions, such as sintering, may lead to a decrease in electrical conductivity of the material and in addition, may cause the silicon or silicon oxide within the particle to become fused to the graphene or graphene oxide. As a result, the capacity generated by the particles may decrease.

After the slurry is dried, the formed electrode may be calendered. In an embodiment, the calendaring process compresses the electrode thus decreasing the void space within the dried electrode. In another embodiment, the dried electrode may be calendered to achieve a target void space and internal porosity that provides for increased lithium diffusion, in addition to structural integrity. In an embodiment, the calendaring process may utilize a roller, or other such tool, that is rolled over the dried electrode to ensure a proper internal porosity. In an embodiment, the calendaring process may range from about 30 seconds to about 5 minutes depending upon the thickness of the electrode and the desired internal porosity. In an embodiment, the electrode internal porosity may range from about 40 percent to about 60 percent, or the internal porosity may be about 50 percent. Internal porosity is measured by the following equation:

$$\text{Porosity } (\%) = 1 - \left(\frac{\text{measured density}}{\text{theoretical density}}\right)$$

where the measured density is measured by dividing the mass of the dried electrode by its volume and the theoretical density is the density of the active electrode material that is 100 percent dense. The theoretical density is assumed to be 2.25 g/cubic centimeter. In an embodiment, constructing the electrode to a targeted optimal internal porosity provides additional channels within which lithium ions may diffuse while also providing the required structural integrity for long life in an electrochemical environment within the cell. The increased internal porosity thus provides for an increased volume of lithium ions to diffuse through the electrode. In addition, increasing the internal porosity shortens the distance with which lithium ions travel through the electrode. As a result of the increased internal porosity, the charge/discharge rate capability of the electrode and resulting electrochemical cell increases.

In an embodiment, after the drying process the first component consisting of graphene, graphene oxide, at least partially reduced graphene oxide or combinations thereof, comprises from about 10 to about 70 weight percent, the active material particles comprise from about 30 weight percent to about 90 weight percent, and the third non-active material portion comprises from about 0.01 weight percent to about 5 weight percent of the electrode.

The formulated electrode is an anode or negative electrode that is utilized within a secondary lithium-ion electrochemical cell. The electrochemical cell of the present invention further comprises a cathode composed of an electrically conductive material that serves as the other, positive electrode of the cell. The cathode is of solid materials and the electrochemical reaction at the cathode involves conversion of lithium ions that migrate back and forth between the anode, i.e., a first electrode, and the cathode, i.e., a second electrode, into atomic or molecular forms. During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte and into the anode.

The solid cathode may comprise a cathode active material of a metal oxide, a lithiated metal oxide, a metal fluoride, a lithiated metal fluoride or combinations thereof as disclosed in U.S. patent application Ser. No. 14/745,747 to Hayner et al., which is assigned to the assignee of the present application and incorporated fully herein by reference. In an embodiment, the cathode active material comprises $LiNi_xCo_yAl_zO_2$, where x, y, and z are greater than 0 and wherein x+y+z=1. Other cathode active materials may include, but are not limited to lithium cobalt oxide ($LiCoO_2$), lithium iron phosphate ($LiFePO_4$) and lithium manganese oxide ($LiMn_2O_4$). Additional cathode active materials may also include, but are not limited to, $LiNi_xMn_yCo_zO_2$, where 0.3≤x≤1.0, 0≤y≤0.45, and 0≤z≤0.4 with x+y+z=1. Furthermore, the cathode active material may comprise $Li_{1+x}Ni_\alpha Mn_\beta Co_\gamma O_2$, where x ranges from about 0.05 to about 0.25, a ranges from about 0.1 to about 0.4, β ranges from about 0.4 to about 0.65, and γ ranges from about 0.05 to about 0.3.

In a larger scope, the cathode active material may comprise sulfur (S), lithium sulfide ($Li_2S$), a metal fluoride, a lithium metal fluoride, a lithium metal phosphate, and a lithium metal silicate where the metal may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include $MF_x$ where 0≤x≤3, $Li_xMF_x$ where 0≤x≤3, $LiMPO_4$, $Li_2MSiO_4$ composite layered-spinel structures such as $LiMn_2O_4$-LiMO where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium rich positive active electrode materials of particular interest can also be represented approximately by the formula $Li_{1+x}Ni_aMn_bCo_cA_dO_{2-z}F_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

The cathode active material is formed by the chemical addition, reaction, or otherwise intimate contact of various oxides, phosphates, sulfides and/or metal elements, during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. In an embodiment, a cathode active material is a reaction product of stoichiometric proportions of at least fully lithiated to non-lithiated, $LiNi_{0.8}Co_{0.15}Al_{0.05}O_2$.

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX® (Chemplast Inc.), polypropylene membrane, commercially available under the designation CELGARD® (Celanese Plastic Company Inc.) and DEXIGLAS® (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present application is activated with a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent and an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The electrolyte of the present invention comprises an inorganic salt having the general formula $YAF_6$ wherein Y is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof. Alternatively, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. The alkali metal salt of the electrolyte comprises either lithium hexafluoroarsenate or lithium hexafluorophosphate dissolved in a 50/50 solvent mixture (by volume) of EC/DMC. In an embodiment, the electrolyte may comprise 0.8M to 1.5M $LiAsF_6$ or $LiPF_6$ dissolved in a 50:50 mixture, by volume, of dimethyl carbonate and ethylene carbonate.

The form of the electrochemical cell is a lithium ion cell wherein the anode/cathode couple is inserted into a conductive metal casing. An example material for the casing is stainless steel, although titanium, mild steel, nickel, nickel-plated mild steel and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

The glass-to-metal seal may comprise a corrosion resistant glass having from between about 0% to about 50% by weight silica such as CABAL-12, and TA-23 glasses developed by Sandia National Laboratories® or FUSITE® MSG-12, FUSITE® A-485, FUSITE® 425 or FUSITE®435. The positive terminal pin feedthrough may comprise titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. Migration of the lithium ions between the anode and cathode occurs in atomic or molecular forms.

Sample lithium-ion cells were constructed with anodes fabricated using the material formulation and fabrication method thereof of the present application. A counter electrode of pure lithium was used to complete each of the test cells. In an embodiment, the graphene or graphene oxide that forms the particle capsule is of a crumpled morphology. Three lithium ion cells were constructed and discharge tested for each test and control group.

Test Group 1

Three lithium ion test group 1 cells were constructed. Each of the cells was constructed having an anode that comprised 0.75 g of a composite anode material comprising 66 weight percent 50 nm particle silicon coated in non-cross-linked polyvinyl alcohol encapsulated in graphene and pyrolyzed at 700° C. for 1 hour in argon. The composite anode material was mixed with 0.05 g of carbon black and 2.0 g of lithium polyacrylate binder. The resulting slurry was applied to a copper current collector foil with a loading of 2.0 mAh/cm$^2$ and a density of 1.3 g/cc. The slurry was dried and calendared to an internal porosity of 45% to form the electrode. The electrode was assembled into a cell having a counter electrode composed of lithium. An electrolyte comprising 1.2M LiPF6 in EC:DMC (30:70 weight percent) and 20 weight percent FEC was injected into the test cell.

Test Group 2

Three lithium ion test group 2 cells were constructed. Each of the cells was constructed having an anode that comprised 0.75 g of the composite anode material prepared per Example 1. The composite anode material was mixed with 0.05 g carbon black and 2.0 g lithium polyacrylate binder. The resulting slurry was applied to a copper current collector foil with a loading of 2.0 mAh/cm$^2$ and a density of 1.3 g/cc. The slurry was dried and calendared to an internal porosity of 45% to form the electrode. The electrode was assembled into a cell having a counter electrode composed of lithium. An electrolyte comprising 1.2M LiPF6 in EC:DMC (30:70 weight percent) and 20 weight percent FEC was used in the test cells.

Test Group 3

Three lithium ion test group 3 cells were constructed. Each of the cells was constructed having an anode that comprised 0.75 g of the composite anode material formulated per Example 2. The composite anode material was mixed with 0.05 g carbon black and 2.0 g lithium polyacrylate binder. The resulting slurry was applied to a copper current collector foil with a loading of 2.0 mAh/cm$^2$ and a density of 1.3 g/cc. The slurry was dried and calendared to an internal porosity of 45% to form the electrode. The electrode was assembled into a cell having a counter electrode composed of lithium. An electrolyte comprising 1.2M LiPF6 in EC:DMC (30:70 weight percent) and 20 weight percent FEC was used in the test cells.

Control Cells

In addition to the test cells having electrodes comprising the composite anode material of the present application, lithium electrochemical control cells were constructed and tested in comparison. In an embodiment, the lithium electrochemical control cells were constructed with anodes that included anode active material comprising crumpled graphene encapsulated silicon fabricated per the process disclosed in U.S. patent application publication number 2013/0199605 to Huang et al., which is incorporated fully herein by reference.

Control Group 1

Three lithium ion control group 1 cells were constructed. Each of the cells was constructed having an anode that comprised 0.75 g of an electrochemically active control material comprising 50 nm particle size silicon having a 66 weight percent encapsulated in graphene was mixed with 0.05 g of carbon black and 2.0 g of lithium polyacrylate binder. The resulting slurry was applied to a copper current collector foil with a loading of 2.0 mAh/cm$^2$ and a density of 1.3 g/cc. The slurry was dried and calendared to an internal porosity of 45% to form the electrode. The electrode was assembled into a cell having a counter electrode composed of lithium. An electrolyte comprising 1.2M LiPF$_6$ in EC:DMC (30:70 weight percent) and 20 weight percent FEC was used in the control cells.

Control Cell 2

Three lithium ion control group 2 cells were constructed. Each of the cells was constructed having an anode that comprised 0.75 g of an electrochemically active control material comprising silicon having a 100 nm particle size having 66 weight percent encapsulated in graphene was mixed with 0.05 g carbon black and 2.0 g lithium polyacrylate binder. The resulting slurry was applied to a copper current collector foil with a loading of 2.0 mAh/cm$^2$ and a density of 1.3 g/cc. The slurry was dried and calendared to an internal porosity of 45% to form the electrode. The electrode was assembled into a cell having a counter electrode composed of lithium. An electrolyte comprising 1.2M LiPF$_6$ in EC:DMC (30:70 weight percent) and 20 weight percent FEC was used in the control cells.

Table II, shown below, identifies the particle structure of the electrochemically active anode materials that were used in the test and control group cells.

TABLE II

| Cell Group | Silicon Particle Size | Particle Construction |
|---|---|---|
| Test Group 1 | 50 nm | Pyrolyzed Non Cross-linked PVA Coated Silicon in Graphene Shell |
| Test Group 2 | 50 nm | Pyrolyzed 3 Weight Percent Boric Acid Cross-linked PVA Coated Silicon in Graphene Shell |
| Test Group 3 | 100 nm | Pyrolyzed 2 Weight Percent Boric Acid Cross-linked PVA Coated silicon in Graphene Shell |
| Control Group 1 | 50 nm | Silicon Encapsulated in Crumpled Graphene |
| Control Group 2 | 100 nm | Silicon Encapsulated in Crumpled Graphene |

All test and control cells were subjected to a pulse discharge test regimen to test the capacity retention and coulombic efficiency of the respective cells. Each of the cells were tested at a discharge rate sequence that comprised C/20 for the first cycle, C/10 for the second cycle, C/5 for the third cycle, and C/2 for all subsequent cycles to a predetermined threshold voltage of about 1.5 V. The pulse discharge regimen included a series of alternating 5 second current pulse and 5 second rest periods until a nominal voltage of 1.5 V was reached.

Figure 6:
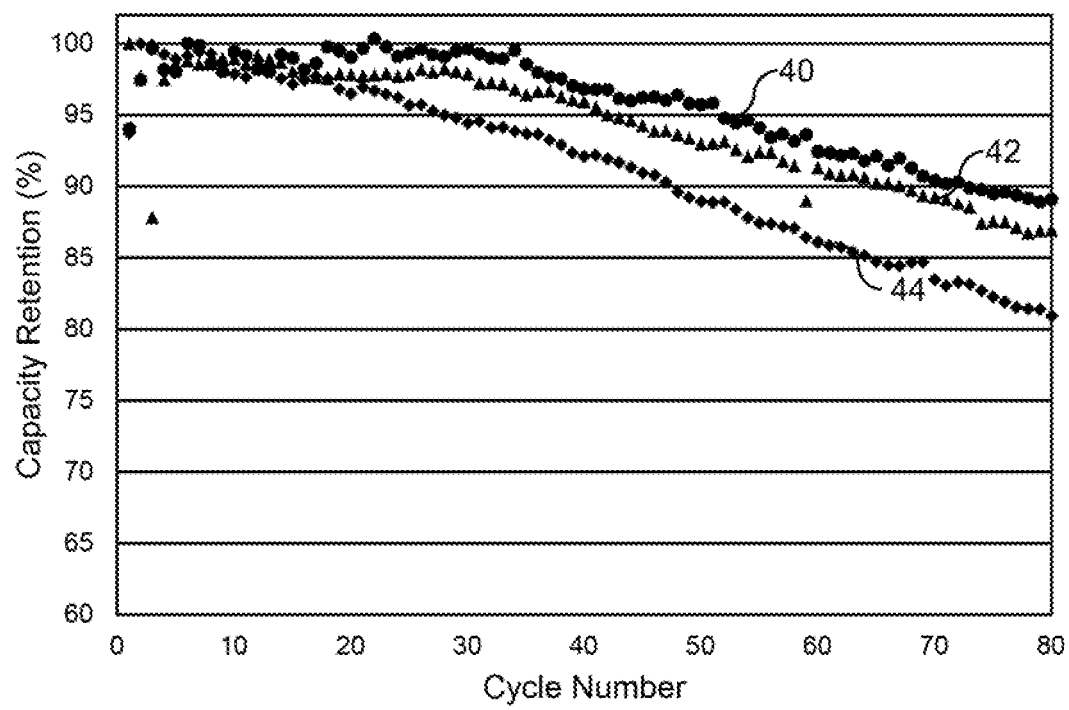
FIG. 6 is a graph that shows discharge testing results illustrating capacity retention as a function of discharge cycle of test cells in comparison to control cells.
Figure 7:
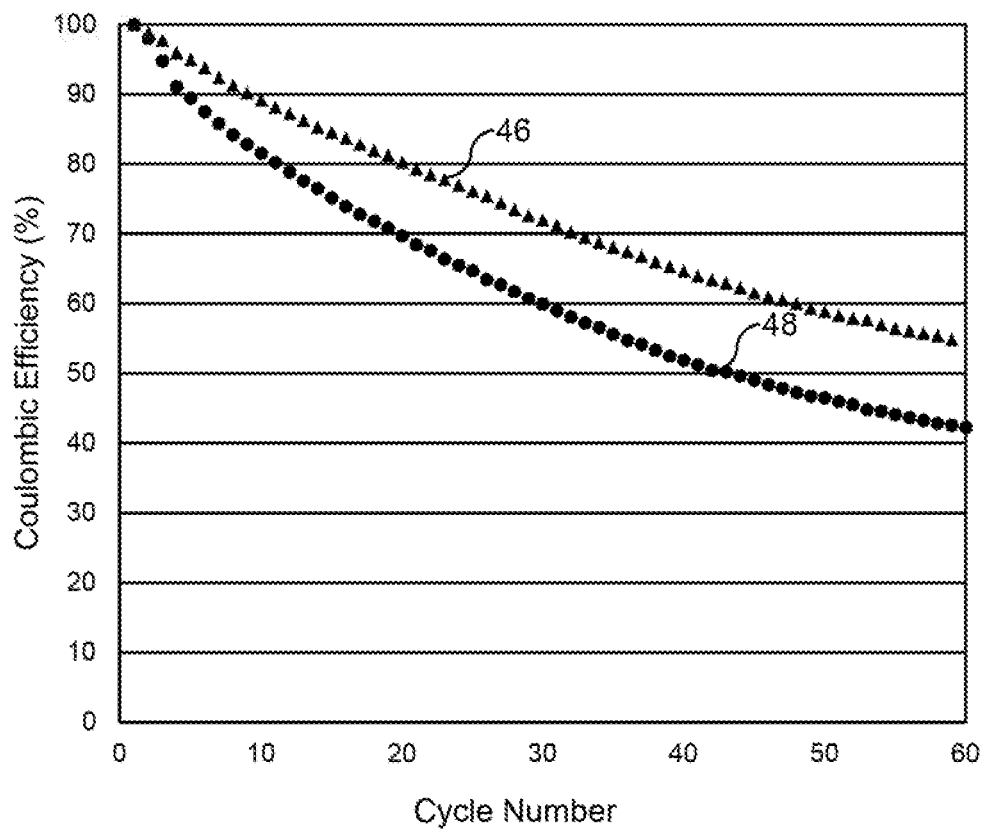
FIG. 7 is a graph that shows discharge testing results illustrating capacity retention as a function of discharge cycle.
Figure 8:
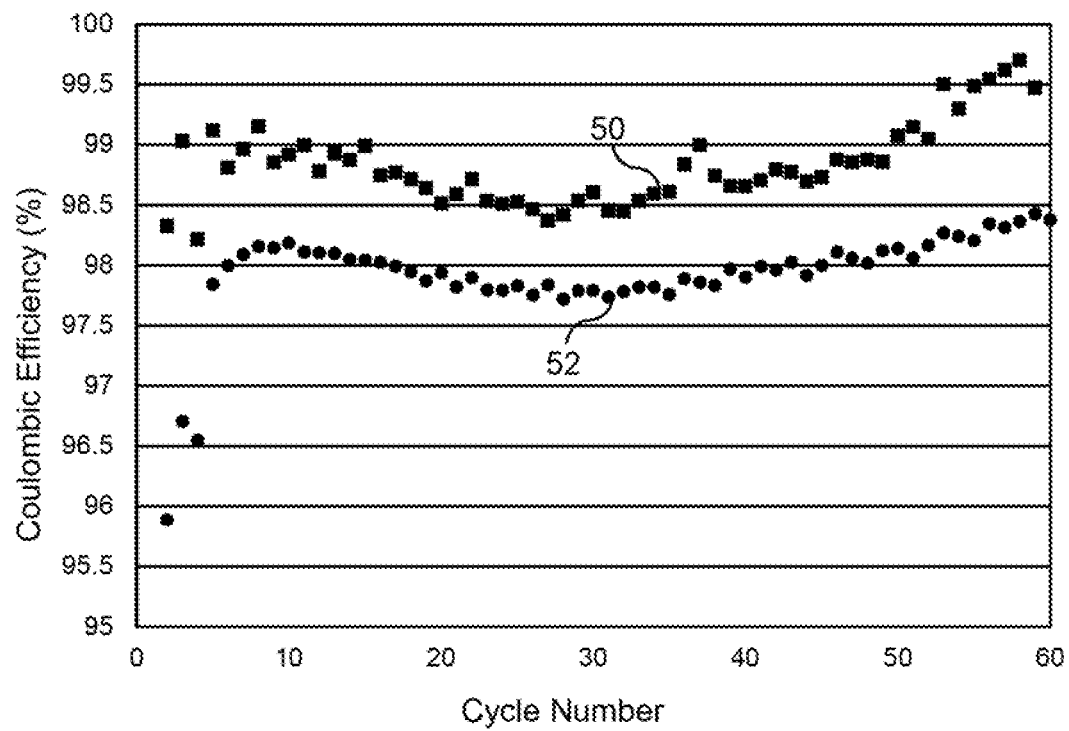
FIG. 8 is a graph that shows discharge testing results illustrating coulombic retention as a function of discharge cycle of test cells in comparison to control cells.

FIGS. 6-8 illustrate the results of the pulse discharge testing. FIGS. 6 and 7 show capacity retention, as a percentage of the total cell capacity, as a function of the number of charge/discharge cycles. FIG. 8 shows percent coulombic efficiency as a function of the number of charge/discharge cycles. As shown in the results of the pulse discharge testing, the composite anode material of the present application exhibited an overall greater capacity retention and coulombic efficiency as a function of charge/discharge cycles in comparison to the control test groups.

As illustrated in FIG. 6, Test Groups 1 and 2 cells exhibited a greater capacity retention in comparison to the Control Group 1 cells constructed with an anode comprising the anode active material composed of graphene wrapped silicon. Specifically as shown, the Test Group 1 (curve 40) and 2 (curve 42) cells exhibited a capacity retention of about 88 and 87 percent, respectively, after 80 charge/discharge cycles. In comparison, the Control Group 1 cells (curve 44) exhibited a capacity retention of about 80 percent after 80 charge/discharge cycles. These test results appear to indicate that the buffer layer 16 comprising polyvinyl alcohol combined with the graphene capsule enhances capacity retention in comparison to lithium cells constructed with anodes composed of a composite anode material comprising graphene wrapped silicon.

FIG. 7 discloses discharge testing results for Test Group 3 cells (curve 46) in comparison to Control Group 2 cells (curve 48). As shown, the Test Group 3 cells (curve 46) exhibited a greater overall capacity retention in comparison to the Control Group 2 cells (curve 48). Specifically, the Test Group 3 cells exhibited a capacity retention of about 59 percent after 80 charge/discharge cycles. In comparison, the Control Group 2 cells exhibited a capacity retention of about 45 percent after 80 charge/discharge cycles. These test results also appear to indicate that the outer coating layer 16 comprising polyvinyl alcohol combined with the graphene capsule enhances capacity retention in comparison to lithium cells constructed with anodes composed of a composite anode material comprising graphene wrapped silicon. In addition, these test results also appear to indicate that silicon having a smaller particle size improves capacity retention as Test groups 1 and 2 cells in addition to Control Group 1 cells having silicon with a particle size of 50 nm exhibit a greater capacity retention in comparison to lithium cells constructed with anodes comprising silicon with a particle size of 100 nm.

Furthermore, as indicated in Table III, Test Group 2 cells constructed with anodes comprising graphene wrapped pyrolyzed boric acid cross-linked PVA coated Si having a 50 nm particle size exhibited a greater first coulombic efficiency of 78.3% and an average coulombic efficiency of 99.14% from discharge cycle 5 to cycle 50. In comparison, Control Group 1 cells constructed with anodes comprising graphene wrapped Si having a 50 nm particle size exhibited a first coulombic efficiency (FCE) of about 78 and an average coulombic efficiency of 98.5 percent from discharge cycle 5 to cycle 50. In addition, Test Group 3 cells constructed with anodes comprising graphene wrapped pyrolyzed boric acid cross-linked PVA coated Si having a 100 nm particle size exhibited a greater first coulombic efficiency and average coulombic efficiency in comparison to Control Group 2 cells constructed with anodes comprising graphene wrapped Si having a 100 nm particle size. As indicated by Table III, Test Group 3 cells exhibited a first coulombic efficiency of 89.2 percent and average coulombic efficiency of 98.7 percent in comparison to the Control Group 2 cells which exhibited a first coulombic efficiency of 78.5 percent and average coulombic efficiency of 97.9 percent. These test results appear to indicate that lithium electrochemical cells constructed with anodes comprising pyrolyzed boric acid cross-linked polyvinyl (PVA) coated silicon significantly improves the coulombic efficiency of a lithium electrochemical cell.

TABLE III

| | First Coulombic Efficiency (FCE) (%) | Average Coulombic Efficiency (%) (5-50 cycles) | Number Cycles > 80% Coulombic Efficiency |
|---|---|---|---|
| Control Group 1 | 78 | 98.5 | 80 |
| Control Group 2 | 78.5 | 97.9 | 11 |
| Test Group 1 | 69.3 | 98.7 | 128 |
| Test Group 2 | 78.3 | 99.14 | 114 |
| Test Group 3 | 89.2 | 98.7 | 21 |

FIG. 8 discloses coulombic efficiency as a function of discharge cycle for the Test Group 3 cells (curve 50) in comparison to the Control Group 2 cells (curve 52). As shown, the Test Group 3 cells (curve 50) exhibited a significantly greater coulombic efficiency in comparison to the Test Group 3 cells. As shown, the Test Group 3 cells exhibited a coulombic efficiency of about 99.7 percent after 60 cycles in comparison to the Control Group 2 cells which exhibited a coulombic efficiency of about 98.5 percent after 60 cycles.

This improvement in capacity retention and coulombic efficiency exhibited by the Test Group cells of the present application is believed to be attributed to the incorporation of pyrolyzed boric acid cross-linked PVA coated silicon and wrapped within graphene. More specifically, it is believed that the pyrolyzed boric acid cross-linked PVA that coats the silicon, provides a buffer medium that surrounds the silicon that helps prevent mechanical degradation of the silicon and stabilizes solid electrolyte interphase (SEI) loss. Furthermore, the graphene wrapping further provides space between the encapsulated silicon and the outer graphene wrapping thereby creating the buffer matrix structure. The buffer matrix structure comprising the polymeric coated silicon and the graphene wrapping thus provides mechanical support of the silicon and provides additional void space within which the coated silicon may expand. In addition, should the coated silicon fracture, the graphene wrapping contains the broken silicon pieces in a congruent configuration reducing capacity loss from electrical disconnection.

Thus, the results of the pulse discharge regimen clearly show that the buffer matrix particle structure of the composite anode material of the present application improves capacity retention and coulombic efficiency.

The present application thus provides a plurality of embodiments of composite anode material formulations that serve to stabilize and help prevent the breakdown of the core material therewithin. Furthermore, the particle structure of the composite anode material provides a buffer matrix that allows for the mechanical expansion of the core, i.e., silicon, while providing for mechanical support of the core particles. As a result, the silicon particles remain intact, thereby reducing capacity loss and cycle life. In addition, coulombic efficiency and capacity retention are also enhanced. It is appreciated that various modifications to the inventive concepts described herein may be apparent to those of ordinary skill in the art without departing from the spirit and scope of the present invention as defined by the appended claims.

What is claimed is:

1. A composite anode material, comprising:
capsules comprising crumpled sheets of graphene, crumpled sheets of graphene oxide, crumpled sheets of at least partially reduced graphene oxide, or combinations thereof; and
active material particles disposed within the capsules, each active material particle comprising:
a core comprising silicon, silicon oxide, or a combination thereof; and
a buffer layer at least partially surrounding the core and comprising a polymeric material or a pyrolyzed polymeric material,
wherein each capsule defines an interior void space configured to accommodate volumetric expansion of the active material particles during charging of the composite anode material, and
wherein the composite anode material provides a buffer matrix in which a combination of the buffer layer and the interior void space within each capsule reduce mechanical degradation of the core during lithium ion intercalation and deintercalation.

2. The composite anode material of claim 1, wherein the cores have an average particle size ranging from about 50 nm to about 400 nm.

3. The composite anode material of claim 1, wherein:
the capsules comprise a single active material particle or a plurality of the active material particles; and
the active material particles each comprise a single core disposed in the buffer layer or a plurality of the cores disposed in the buffer layer.

4. The composite anode material of claim 1, wherein the composite anode material has an average particle size that ranges from about 0.5 µm to about 10 µm.

5. The composite anode material of claim 1, wherein the buffer layers comprise the pyrolyzed polymeric material.

6. The composite anode material of claim 1, wherein the buffer layers have an average thickness that ranges from about 1 nm to about 50 nm.

7. The composite anode material of claim 1, wherein the buffer layers comprise the polymeric material and the polymeric material is chemically cross-linked.

8. The composite anode material of claim 7, wherein the polymeric material is chemically cross-linked by boric acid, citric acid, glutaraldehyde (GA), fumaric acid, or a combination thereof.

9. The composite anode material of claim 7, wherein the polymeric material comprises polyvinyl alcohol (PVA), polyvinyl butyral (PVB), polyvinyl formal (PVF), polyacrylonitrile (PAN), or a combination thereof.

10. An electrode, comprising:
    capsules comprising crumpled sheets of graphene, crumpled sheets of graphene oxide, crumpled sheets of at least partially reduced graphene oxide, or combinations thereof;
    at least one active material particle disposed within each of the capsules, each active material particle comprising:
        a core comprising silicon, silicon oxide or combinations thereof; and
        a buffer layer surrounding the core and comprising a polymeric material or a pyrolyzed polymeric material; and
    a binder,
    wherein each capsule defines an interior void space configured to accommodate volumetric expansion of the active material particles during charging of the composite anode material, and
    wherein the composite anode material provides a buffer matrix in which a combination of the buffer layer and the interior void space within each capsule reduce mechanical degradation of the core during lithium ion intercalation and deintercalation.

11. The electrode of claim 10, wherein the cores have an average particle size ranging from about 50 nm to about 400 nm.

12. The electrode of claim 10, wherein the binder comprises polytetrafluoroethylene (PTFE), polyvinylidene fluoride (PVDF), poly(acrylic) acid, polyethylenetetrafluoroethylene (ETFE), a polyamide, a polyimide, polyethylene, styrene-butadiene rubber, cellulose, polyacrylate rubber, or a mixture thereof.

13. The electrode of claim 10, wherein the electrode has an internal porosity that ranges from about 40 percent to about 60 percent, as measured by the equation:

$$\text{Internal Porosity (\%)} = 1 - \left(\frac{\text{measured density}}{\text{theoretical density}}\right)$$

where the measured density is measured by dividing the mass of a dried electrode by its volume and the theoretical density is the density of the composite anode material that is 100 percent dense.

14. The electrode of claim 10, wherein the buffer layers comprise the pyrolyzed polymeric material.

15. The electrode of claim 10, wherein the polymeric material comprises polyvinyl alcohol (PVA), polyvinyl butyral (PVB), polyvinyl formal (PVF), polyacrylonitrile (PAN), or a combination thereof.

16. The electrode of claim 10, wherein the buffer layers comprise the polymeric material, and the polymeric material is chemically cross-linked.

17. The electrode of claim 16, wherein the polymeric material is chemically cross-linked by boric acid, citric acid, glutaraldehyde (GA), fumaric acid, or a combination thereof.

18. A method of fabricating an anode electrode, the method comprising:
    mixing the composite anode material of claim 1 with a solvent and a binder to form a slurry:
    coating a substrate with the slurry; and
    drying the coated substrate to form the anode electrode.

19. The method of claim 18, wherein the binder comprises_polytetrafluoroethylene (PTFE), polyvinylidene fluoride (PVDF), poly(acrylic) acid, polyethylenetetrafluoroethylene (ETFE), polyamides, and polyimides, polyethylene, styrene-butadiene rubber, cellulose, polyacrylate rubber, or a mixture thereof.

20. The method of claim 18, wherein the solvent comprises water, ethanol, isopropyl alcohol, ethylene glycol, ethyl acetate, polar protiac solvents, polar aprotic solvents, N-methyl-2-pyrrolidone or a combination thereof.

* * * * *